Oct. 27, 1936.  H. W. LINK  2,058,894
SPEED AND LOAD REGULATING DEVICE FOR HYDRAULIC TRANSMISSIONS
Filed Oct. 5, 1932
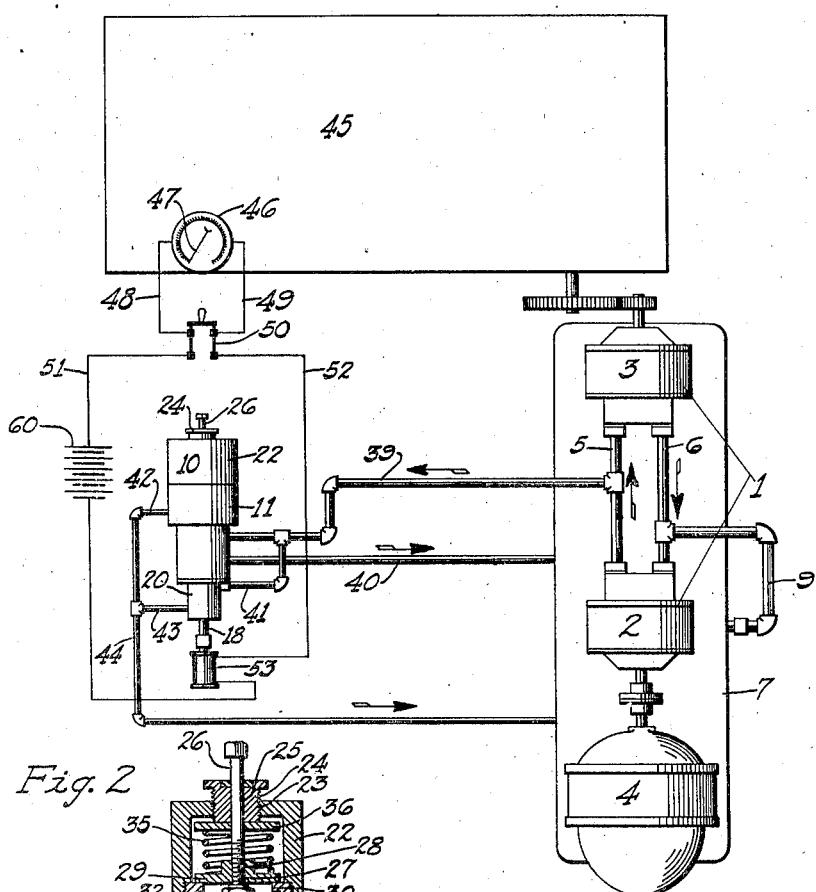
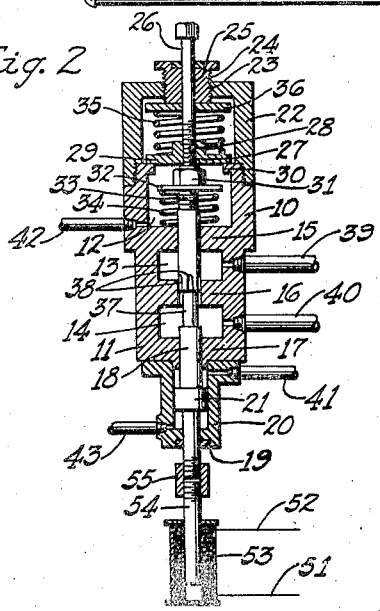
Inventor
Harry W. Link
By Carl X. Libbe
Attorney Patented Oct. 27, 1936

2,058,894

UNITED STATES PATENT OFFICE 2,058,894

SPEED AND LOAD REGULATING DEVICE FOR HYDRAULIC TRANSMISSIONS

Harry W. Link, Philadelphia, Pa., assignor, by mesne assignments, to American Engineering Company, Philadelphia, Pa., a corporation of Pennsylvania Application October 5, 1932, Serial No. 636,321

4 Claims. (Cl. 60—53)

This invention relates to speed and load regulating devices for hydraulic transmissions. In transmissions of the type employing pump and motor units it has been found that as the load increases the speed thereof decreases due to the increasing leakage of fluid in both the pump and motor of said transmission. This change in speed of the transmission for each change in load is extremely undesirable especially where constant speed transmissions are required, and it is the principal object of the present invention to provide means for compensating for this leakage to insure a constant running speed of the transmission for all loads.

A further object of the invention is to provide means for bypassing the fluid discharging from the pump to the motor of the transmission when the load reaches a predetermined maximum thereby interrupting the operation of the motor, and to cause renewal of operation of said motor when the load decreases from this predetermined value.

Other and further objects will become apparent as the description of the invention progresses.

Of the drawing:

Fig. 1 is a general plan view showing an hydraulic transmission and a speed and load regulating device associated therewith.

Fig. 2 is a sectional view taken through the speed and load regulating device comprising the present invention.

Referring to the drawing, the numeral 1 indicates an hydraulic transmission comprising a pump 2, and an hydraulic motor 3, of the general type disclosed in United States Patent No. 1,077,979. Pump 2 is driven at a constant rate of speed by an electric motor 4 and the fluid delivered by said pump to motor 3 flows in the direction of the arrows through pipe connections 5 and 6 causing rotation of the motor 3 in a well known manner. The hydraulic transmission 1 and electric motor 4 are suitably supported upon a reservoir casing 7. Fluid may be drawn into the transmission 1 from this reservoir for makeup purposes through pipe 9.

The leakage occurring in transmissions of the character set forth has been found by experimentation to vary from zero at no load to a maximum of substantially six percent of the fluid pumped at full load conditions. Due to this leakage, the speed of rotation of motor 3 falls off as the load increases.

I have devised a speed and load regulating device 10 which compensates for the leakage occurring in the transmission, and thus insures constant speed of the motor 3 for all loads. This device is so adjusted that when the transmission 1 is operating under no load conditions, substantially six percent of the fluid delivered to motor 3 by pump 2 is bypassed. The amount of fluid bypassed through this regulating device 10 decreases as the load imposed upon the transmission increases, and when full load conditions are attained and the leakage in the transmission reaches a maximum, no fluid is bypassed through the regulating device. By this device, it is seen that the motor 3 will operate at a constant speed for all loads. Referring to Fig. 2, the regulating device 10, comprises a substantially cylindrical casing 11 having provided therein chambers 12, 13 and 14 separated by partitions 15 and 16. Partitions 15 and 16 and the bottom wall 17 of casing 11 are provided with aligned apertures which receive and guide a valve member 18 for axial movement. The lower end of valve 18 extends through and is guided in an aperture provided in the end wall 19 of a cylinder 20 secured to the lower end of casing 11 by any suitable means. A piston 21 operating in cylinder 20 is secured to valve 18 near the lower end thereof. A cap 22 is secured to the upper end of casing 11 and has provided therein a tapped aperture 23 into which a plug 24 is adjustably secured. Plug 24 is provided with an aperture 25 through which a rod 26 extends. The lower threaded end 27 of rod 26 extends through a tapped aperture 28 provided in a disk 29 resting upon an annular shoulder 30 provided at the upper end of casing 11. A nut 31 is secured to the upper threaded end 33 of valve 18 and a disk 32 slidably mounted on said valve is positioned therebeneath. Rod 26 rests upon upper end of valve 18 and a purpose thereof, as will hereinafter appear, is to afford a means for adjusting the initial position of said valve. A coil spring 34 encircles the upper end of valve 18 and extends between disk 32 and the bottom wall of chamber 12. A second coil spring 35 encircles rod 26 and extends between disk 29 and a disk 36 positioned adjacent plug 24. The tension of springs 34 and 35 may be adjusted by simply adjusting nut 31 and plug 24, respectively. Valve 18 is provided with a reduced portion 37 intermediate the ends thereof which is adapted to extend through the aperture provided in partition 16 and thus establish communication between chambers 13 and 14. Valve 18 is also provided with a series of graduated grooves 38 extending upwardly from the reduced portion 37 thereof. These grooves are so constructed and arranged that when valve 18 is in its lowermost position, the solid portion thereof completely seals the opening between chambers 13 and 14. However, as valve 18 moves upwardly, due to the construction of grooves 38, progressively larger quantities of fluid may pass from chamber 13 to chamber 14, and when the upper shoulder of reduced portion 37 rises above the bottom wall of chamber 13 substantially free flow of fluid between said chambers is established. A pipe 39 connects chamber 13 with pipe 5, and a second pipe 40 connects chamber 14 with the reservoir 7 so that fluid discharging from pump 2 may circulate through pipe 39, chamber 13, chamber 14, and pipe 40 to the reservoir when communication is established between chambers 13 and 14 by adjustment of valve 18. A branch pipe 41 connects the upper end of cylinder 20 with pipe 39, thus the pressure of the fluid in the system is communicated to piston 21, which adjusts valve 18 accordingly. Pipes 42 and 43 extending from the lower ends of chamber 12 and cylinder 20, respectively, are connected to a drain pipe 44 which communicates with reservoir 7, thus any fluid leaking past valve 18 or piston 21 will drain to the reservoir 7.

The transmission 1 is shown geared to a machine 45 which may be of any type requiring constant speed of operation. The machine 45 may, for example, be a machine employed to test the tensile or compressive strength of such materials as steel, wood, or concrete.

The mechanism just described operates briefly as follows. When no load is imposed upon the transmission 1 practically no leakage takes place therein. Accordingly, valve 18 is adjusted longitudinally by turning rod 26 until the grooves 38 provided therein permit substantially six percent of the oil discharging from pump 2 to motor 3 to bypass from chamber 13 to chamber 14, and thence to the reservoir 7, thus depriving motor 3 of substantially six percent of the oil discharging from pump 2.

It will be remembered that when the transmission is operating under full load conditions substantially six percent of the fluid discharging from pump 2 is lost by leakage in the transmission. Thus by adjusting valve 18 so that at no load conditions the motor 3 will also be deprived of six percent of the fluid flowing through the system, the speed at which motor 3 is operated at no load conditions will be the same as that at which it operates at full load conditions. As the pressure in system builds up piston 21 will move valve 18 downwardly against the tension of spring 34. When this occurs the grooves 38 provided in valve 18 will be partially covered thus permitting a smaller quantity of fluid to flow from chamber 13 to chamber 14. The difference in the amount of fluid bypassing from chamber 13 to chamber 14 for this particular pressure, and that bypassing therebetween for no load conditions, corresponds substantially with the amount of leakage occurring in the transmission. Thus the motor 3 will still be operated at a constant speed.

When the transmission is operating under full load conditions valve 18 will be lowered to such an extent that the opening between chambers 13 and 14 is completely closed; thus no fluid can bypass between said chambers. Under full load conditions the leakage of the transmission is substantially six percent of the total fluid discharged and constant speed of rotation of motor 3 is therefore maintained. When the load imposed upon the transmission decreases spring 34 will urge valve 18 upwardly in accordance with the drop in pressure, thereby permitting an amount of fluid to bypass from chamber 13 to chamber 14 equivalent to the difference in amount of leakage in the transmission. It therefore is seen that motor 3 will operate at a constant speed regardless of the load imposed upon the transmission.

It sometimes is desirable, in certain types of machines, that a constant load be maintained. For example, in testing machines it may be desired to impose a certain constant load upon the object to be tested, and to note the elongation thereof at different intervals of time. In order to maintain a constant load on the object to be tested, the rotation of motor 3 must cease when the predetermined load is attained to prevent increasing the load, and a suitable brake mechanism must necessarily be employed in the testing machine to prevent reversal thereof which obviously would cause a rapid reduction in the load. To prevent further operation of motor 3 after the predetermined load has been obtained, the following mechanism is provided.

Referring to Fig. 1, it will be observed that the machine 45 has attached thereto a pressure gauge 46. This gauge is so constructed that when the pointer 47 thereon registers a predetermined pressure, electrical contacts thereon will close the circuit leading thereto from a suitable source of electric power 60. This type of gauge is well known and a detailed description thereof is unnecessary. For a complete disclosure of such a gauge reference may be had to United States Patent No. 878,423, granted February 4, 1908. A pair of conductors 48 and 49 lead from the contact points of gauge 46 to a switch 50. A second pair of conductors 51 and 52 lead from switch 50 to the coil of a solenoid 53, the armature 54 of which being connected to the lower end of valve 18 of the regulating device 10 by a coupling 55. It therefore is seen that when gauge 46 registers the predetermined load imposed upon machine 45 by transmission 1, the circuit will be closed, causing energization of solenoid 53 with the result that valve 18 will be operated to its uppermost position. When valve 18 assumes this position, fluid will freely bypass from chamber 13 to chamber 14 and substantially the total amount of fluid discharging from pump 2 will flow through pipe 39, chamber 13, chamber 14, and pipe 40 to the reservoir 7, and consequently motor 3 will come to rest. When the load falls off due, for example, to elongation of the object tested, the circuit will be interrupted and solenoid 53 will be deenergized. When this occurs spring 35 will urge valve 18 downwardly and the pressure in the system will build up causing piston 21 to urge valve 18 downwardly, causing the latter to compensate for the leakage in the transmission. Motor 3 will now actuate machine 45 to reestablish the load, and when the predetermined load has again been established electrical contact will again be made in gauge 46 and solenoid 53 will again actuate valve 18 to its uppermost position causing the fluid discharging from pump to flow to the reservoir 7 through the connections previously described, and thus interrupt operation of motor 3.

It therefore is seen that I have provided an effective regulating device which maintains a constant speed of operation of an hydraulic transmission. The device may also be utilized to maintain a constant load upon a machine driven by said transmission.

The regulating device herein described has, for the purpose of illustration, been shown as applied to an hydraulic transmission. It is obvious, however, that it may also be employed to compensate for leakages occurring in pumps or motors alone. It is also obvious that the regulating device may be employed in connection with pumps and motors of the reciprocating type as well as to those of the rotary type, as herein illustrated.

While the embodiment herein described is admirably adapted to fulfill the objects primarily stated, it is to be understood that it is not intended to limit the invention to the single embodiment herein shown since it may be embodied in other forms, all coming within the scope of the claims which follow.

What is claimed is:

1. In a device of the class described, the combination with a transmission including a pump and a motor, of adjustable valve means for compensating for the leakage in said transmission to maintain constant the speed of operation of said motor, fluid pressure means for adjusting said valve means, and additional means for adjusting said valve means to fully open position to bypass the total discharge of said pump to exhaust.

2. In a device of the class described, the combination with an hydraulic transmission including a pump and a motor, of adjustable valve means for compensating for the leakage in said transmission to maintain constant the speed of operation of said motor, fluid pressure means for adjusting said valve means, and a solenoid for actuating said valve means to fully open position to bypass the total discharge of said pump to exhaust.

3. In a device of the class described, the combination of a transmission including a pump and a motor, pressure and suction connections between said pump and motor, means for compensating for leakage in said transmission to maintain constant the speed of operation of said motor, said means comprising an adjustable valve operatively connected to said pressure connection, means for adjusting said valve in accordance with the load imposed upon said motor, to permit progressively smaller quantities of the fluid discharged by said pump to bypass to exhaust as the load imposed upon said motor increases, and additional means for adjusting said valve to fully open position to bypass the total discharge of said pump to exhaust.

4. In a device of the class described, the combination of a transmission including a pump and a motor, pressure and suction connections between said pump and motor, means for compensating for leakage in said transmission to maintain constant the speed of operation of said motor, said means comprising an adjustable valve operatively connected to said pressure connection, means for adjusting said valve in accordance with the load imposed upon said motor, to permit progressively smaller quantities of the fluid discharged by said pump to bypass to exhaust as the load imposed upon said motor increases, and a solenoid for adjusting said valve to fully open position to bypass the total discharge of said pump to exhaust.

HARRY W. LINK.